(12) United States Patent
Miura et al.

(10) Patent No.: US 6,728,154 B2
(45) Date of Patent: Apr. 27, 2004

(54) THREE-DIMENSIONAL OPTICAL MEMORY MEDIUM AND PROCESS FOR PRODUCING SAME

(75) Inventors: Kiyotaka Miura, Yamaguchi (JP); Seiji Fujiwara, Yamaguchi (JP)

(73) Assignee: Central Glass Company, Limited, Yamaguchi (JP)

( * ) Notice: Subject to any disclaimer, the term of this patent is extended or adjusted under 35 U.S.C. 154(b) by 247 days.

(21) Appl. No.: 09/771,940

(22) Filed: Jan. 30, 2001

(65) Prior Publication Data

US 2001/0028507 A1 Oct. 11, 2001

(30) Foreign Application Priority Data

Jan. 31, 2000 (JP) ........................................ 2000-022315

(51) Int. Cl.[7] .............................. G11C 13/04; G11B 7/00
(52) U.S. Cl. ....................... 365/215; 369/100; 369/121; 369/282; 369/288; 250/361 R; 250/362; 250/367; 250/368
(58) Field of Search .................................. 365/120, 106, 365/119, 117, 215; 369/100, 121, 282, 288; 250/361 R, 362, 363.01, 367, 368

(56) References Cited

U.S. PATENT DOCUMENTS

| 4,471,470 A | 9/1984 | Swainson et al. ............ 365/127 |
| 5,163,039 A | * 11/1992 | Lindmayer .................... 369/100 |
| 5,559,784 A | * 9/1996 | Ota ................................ 369/94 |
| 5,694,249 A | 12/1997 | Misawa ........................ 359/620 |
| 5,748,598 A | * 5/1998 | Swanson et al. ............... 369/94 |
| 6,514,435 B1 | * 2/2003 | Hasan et al. .................. 252/584 |

FOREIGN PATENT DOCUMENTS

| EP | 0371580 | 6/1990 |
| EP | 1055453 | 11/2000 |
| JP | 07-324142 | * 12/1995 |
| JP | 08-003347 | * 1/1996 |
| JP | 8-220668 | 8/1996 |
| JP | 11-232706 | 8/1999 |
| WO | 98/53448 | 11/1998 |
| WO | 99/36171 | 7/1999 |

OTHER PUBLICATIONS

K. Hirao et al., "Room temperature persistent spectral hole burning of $SM^2$ in fluorohafnate glasses", 55 *Journal of Luminesence* 217, 219 (1993).

* cited by examiner

*Primary Examiner*—Evelyn A. Lester
(74) *Attorney, Agent, or Firm*—Crowell & Moring LLP

(57) ABSTRACT

The invention relates to a three-dimensional optical memory medium capable of recording and reading a large quantity of information therein and therefrom, and a process for producing the same. A recording pulsed laser beam is applied to an arbitrary position in a luminescent-ion-containing solid medium as the solid medium is three-dimensionally moved relative to a converging point of the pulsed laser beam.

10 Claims, 1 Drawing Sheet

FIGURE
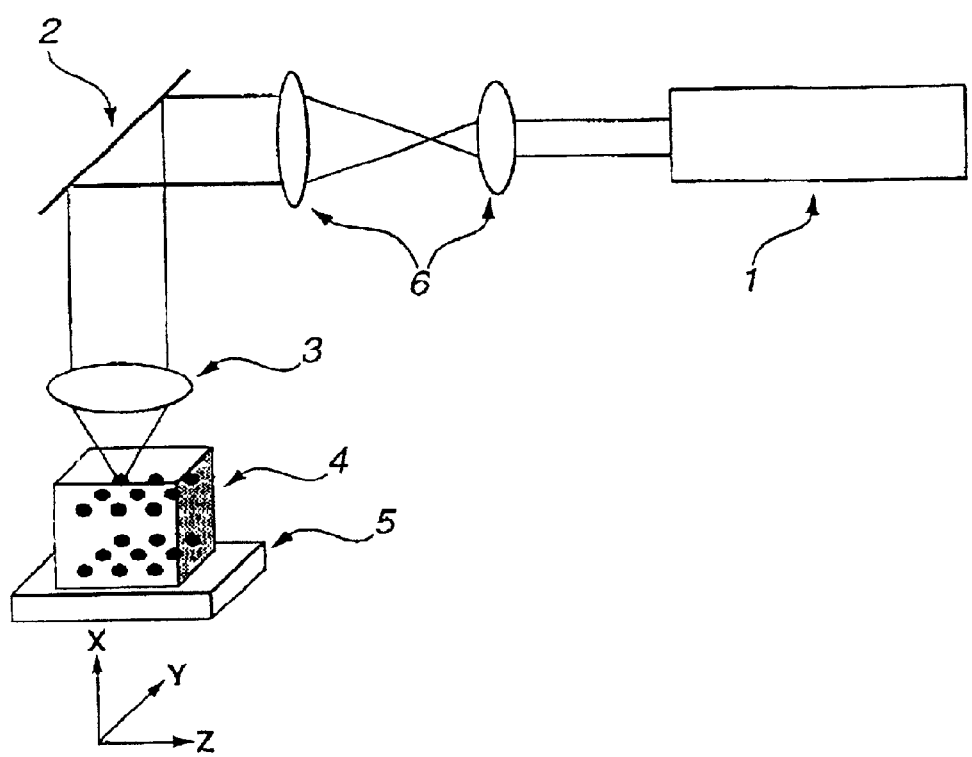

THREE-DIMENSIONAL OPTICAL MEMORY MEDIUM AND PROCESS FOR PRODUCING SAME

BACKGROUND OF THE INVENTION

1. Field of the Invention

This invention relates to a three-dimensional optical memory medium in which information is recorded by three-dimensionally and locally forming a region, in which valence of luminescent ions, such as rare earth element ions, has been varied, in a luminescent-ion-containing solid medium, and thereby varying emission wavelength and luminous intensity of the luminescent ions, relative to surrounding luminescent ions. The invention further relates to a process for producing the three-dimensional optical memory medium by recording information in the solid medium.

2. Description of the Related Art

In recent years, the necessity of increasing the capacity of an optical memory element has risen, and the research into and the development of the techniques concerning the matter are being energetically forwarded. Regarding such techniques, a method of increasing the capacity of an optical memory element by shortening a wavelength of a writing laser beam, and thereby increasing a recording density has been studied. However, since an optical material increases its absorption rate with a shortening of wavelength of such a laser beam, around a half of a currently available wavelength of 780 nm will be a limit level for the shortening of the wavelength. Since a bit size is limited due to a diffraction limit at the wavelength, it is considered that an upper limit for increasing the recording density will be around four times the level currently attainable.

Under the circumstances, the increasing of the capacity of an optical memory element by increasing a spatial dimension of recording from two dimensions to three dimensions, instead of increasing a relative recording density by reducing the size of a recorded region, is being examined. The methods belonging to this system include a method of recording information three-dimensionally by using a photochromic material the transmittance of which varies by the irradiation of light, and a method of three-dimensionally generating variation of refractive index by using photorefractive crystals. However, in the method using a photochromic material, an organic material is liable to cause the photochromic material to encounter the occurrence of deterioration and decomposition thereof ascribed to heat and light. Furthermore, the recording condition varies with the lapse of time, and even the reading light causes an optical reaction due to a high sensitivity of the photochromic material to progress, and the recording condition to vary, these being the drawbacks of this method. On the other hand, in the method using photorefractive crystals, the recording condition becomes different in different axial directions of the crystals during a recording operation since the photorefractive crystals have optical anisotropy.

The study of increasing the capacity of an optical memory element by multiplexing a wavelength of the light used for information reading and writing operations and thereby increasing the recording density per spot is also being forwarded. The techniques belonging to this system include photochemical hole burning (PHB). The photochemical hole burning techniques utilize an enlarged width of an optical absorption spectrum of active centers in a system, in which an organic pigment or rare earth element ions are dispersed as active centers in a transparent solid medium made of glass, a polymer, ionic crystals and metal oxide crystals, in comparison with a width (uniform width) which the spectrum originally has due to the ununiformity of the medium. Namely, when a laser beam of a small width is applied to a specific wavelength within an ununiform width of the spectrum, the absorption of the irradiated wavelength is saturated to put the absorption spectrum in a holed state. According to this method, it is said that a multiplicity of not smaller than $10^3$ per spot can be attained in principle, and that a recording density can be increased to $10^{11}$ bits/cm$^2$.

However, most of the PHB phenomena are observed only at an extremely low temperature of not higher than −200° C., and such a phenomena does not occur at room temperature, and this poses problems. In recent years, a PHB phenomenon has been observed even at room temperature (refer to K. Hirao et al, J. Lumi., 55,217 (1993)) but problems including a low multiplicity and a low production efficiency are left unsolved. A three-dimensional optical memory glass which solves such problems is taught in U.S. Pat. No. 5,694,249 corresponding to Japanese Patent Laid-Open Publication No. 8-220688. This three-dimensional optical memory glass is stable against heat and light, and does not have optical anisotropy. When a pulsed laser beam is condensed or convergently applied to the interior of a glass matrix as the glass matrix is three-dimensionally scanned therewith, photo-induced variation of refractive index occurs in fine spots, and information is recorded as spatial refractive index distribution. This method enables recorded information stable for a long time against heat and light and superior in weather resistance, and enables the recording capacity of an optical disk to be increased.

Optical memory glass utilizing variation of an absorption coefficient of a spot region by forming a single or plural spots in which the particle dispersion condition is locally varied by convergently applying a pulsed laser beam to the interior of a particle-dispersed medium is reported in Japanese Patent Laid-Open Publication No. 11-232706.

The three-dimensional optical memories disclosed in Japanese Patent Laid-Open Publication Nos. 8-220688 and 11-232706 are characterized in that a signal is detected as a reflectance or a transmittance.

However, in the case of the optical memory glass taught in Japanese Patent Laid-Open Publication No. 8-220688, the techniques used therein are confined to inducing refractive index variation by convergently applying a pulsed laser beam to a glass matrix, and the material itself irradiated with the pulsed laser beam is the same. Therefore, a large variation of composition does not occur between the portion of the material in which variation of refractive index occurs and the portion thereof in which variation of refractive index does not occur, and the amount of an induced refractive index variation cannot be increased greatly. In this optical memory glass, variation of transmittance or reflectance caused by variation of refractive index alone is utilized. Due to a small variation of refractive index, a contrast (S/N) in the reading of recorded information may not be increased to a high level.

In the case of the optical memory glass taught in Japanese Patent Laid-Open Publication No. 11-232706, a decrease in an absorption coefficient due to the variation of the number, size and mode of fine particles is utilized, and a reflectance or transmittance is read as a signal. Therefore, it is necessary that the light in an absorption wavelength region of a particle-dispersed medium be used for a reading operation. This may cause a reading contrast (S/N) to be deteriorated as the number of the recording layers increases, and the signal separation between the recording layers to be also deteriorated since an absorption coefficient of a surrounding region is higher than that of the recorded region.

SUMMARY OF THE INVENTION

It is therefore an object of the present invention to provide a three-dimensional optical memory medium that is improved in three-dimensional reading accuracy.

It is another object of the present invention to provide a process for producing such medium.

According to the present invention, there is provided a three-dimensional optical memory medium comprising:

- a solid medium forming a base substrate of said optical memory, said solid medium comprising luminescent ions having a first valence; and
- a plurality of spots which are three-dimensionally distributed in said solid medium, said luminescent ions being contained in said spots and having a second valence different from said first valence as a result of condensing a pulsed laser beam in said solid medium.

According to the present invention, there is provided a process for producing a three-dimensional optical memory medium, said process comprising:

(a) providing a solid medium comprising luminescent ions having a first valence;

(b) condensing a pulsed layer beam to a focal point in said solid medium such that a spot corresponding to said focal point is formed in said solid medium, said spot comprising said luminescent ions having a second valence different from said first valence; and (c) three-dimensionally scanning said solid medium with said pulsed laser beam such that a plural number of said spot are formed three-dimensionally in said solid medium, thereby producing said three-dimensional optical memory medium.

BRIEF DESCRIPTION OF THE DRAWINGS

FIGURE is a schematic view showing a process for recording information in a luminescent-ion-containing solid medium in accordance with the present invention.

DESCRIPTION OF THE PREFERRED EMBODIMENTS

The present invention provides a three-dimensional optical memory medium of a high three-dimensional reading accuracy, formed so as to solve the above-mentioned conventional problems by condensing or convergently applying a pulsed laser beam to a solid medium containing luminescent ions, such as rare earth element ions, and thereby providing a region, in which a valence of the luminescent ions is locally varied, in the luminescent-ion-containing solid medium, whereby emission wavelength and luminous intensity of the luminescent ions are varied relative to those of surrounding luminescent ions. The present invention further provides a process for recording information therein, thereby producing the three-dimensional optical memory medium.

According to a preferred embodiment of the present invention, the three-dimensional optical memory medium can be produced by a process comprising the steps of providing a luminescent-ion-containing solid medium as a base substrate and convergently applying a pulsed laser beam to the interior of the base substrate, whereby a region in which a valence of luminescent ions is locally varied is formed in the interior of the base substrate.

Namely, the present invention provides a three-dimensional optical memory medium capable of recording and reading information therein and therefrom by applying a recording pulsed laser beam to an arbitrary portion of a luminescent-ion-containing solid medium while three-dimensionally moving the solid medium relative to a convergent focal point of the laser beam, and thereby forming spots in which valence of luminescent ions locally differs from that of surrounding luminescent ions, whereby emission wavelength and luminous intensity of the luminescent ions are varied relative to those of the surrounding luminescent ions.

The luminescent ions used in the present invention can be rare earth element ions, and preferable rare earth elements include Ce, Pr, Sm, Eu, Th, Tm and Yb. Further, as the luminescent ions, transition metal ions may be used.

Although a material for a solid medium in which the luminescent ions are to be contained is not specially limited, an inorganic glass material or a crystalline material is preferable. A material obtained by containing at least one of oxides, halides and chalcogenides in one of the above solid media is more preferable. When Al is contained in such material, a threshold value of variation of a valence can be lowered. For example, with respect to inorganic glass materials, a recording threshold value of halide glass such as fluoride glass becomes lower, as compared with that of oxide glass. Regarding the variation of a valence of rare earth element ions due to the irradiation of a pulsed laser beam, oxidation and reduction can be controlled by selecting a suitable combination of rare earth element ions and a solid medium in which the ions are to be contained. The reduction of a material obtained by containing trivalent Sm ions in a fluoride glass containing aluminum fluoride as a main component occurs with a low threshold value and a high efficiency, and an emission wavelength of a recorded region (i.e., the spot) and that of other regions differ from each other distinctly. Accordingly, this material is preferable as a three-dimensional optical memory medium having a high reading contrast.

It is preferable that wavelength of a pulsed laser beam used for generating valence variation does not agree with an absorption wavelength region of a luminescent-ion-containing solid medium. However, when the transmittance in a recorded region of the medium is not lower than 30%, the three-dimensional recording of information in layer can be done.

A peak power density of a pulsed laser beam in a converging or focal region is determined solely by pulse width and pulse energy. The peak power of a pulsed laser beam is expressed by watt (W) as a value obtained by dividing output energy (J) per pulse by a pulse width (second). A peak power density is peak power per unit area ($cm^2$), and expressed by $W/cm^2$. A peak power density of a pulsed laser beam at a converging or focal point is preferably within a range of $10^8$–$10^{17}$ $W/cm^2$. When a peak power density is lower than $10^8$ $W/cm^2$, valence of the luminescent ions does not vary sufficiently in a converging portion. In contrast, when a peak power density exceeds $10^{17}$ $W/cm^2$, a refractive index and a particle dispersion condition vary even in the portions other than a converging point, and target variation may not be obtained. Moreover, a laser beam of an excessively large amount of energy may be difficult to be used in practice. When an optical memory medium is irradiated with a laser beam of the same peak power density, the amount of valence-varied luminescent ions per unit volume increases with a shorter pulse width. It is preferable to use a pulsed laser beam having a pulse width of not greater than $10^{-10}$ seconds, since it is capable of making a writing region smaller and carrying out high-density writing. When a laser beam of an excessively large pulse width is used to irradiate an optical memory medium therewith, it is necessary that the laser beam has extremely large pulse energy for effecting the variation of valence of luminescent ions, so that there is a fear of breaking the luminescent-ion-containing medium.

When a pulsed laser beam is convergently applied to a solid medium containing luminescent ions, such as rare earth element ions, a valence of the luminescent ions varies in the portion of the medium which is in the vicinity of a converging or focal point forming a highest electric field. Emission wavelength, luminous intensity, absorption wavelength and absorption coefficient of the luminescent ions in this portion differ from those of such ions in a non-irradiated region. When a laser beam of such a wavelength that selectively excites a valence-varied region alone is then used for a reading operation, it becomes possible to selectively illuminate the valence-varied region alone, and detect a signal as a sign of occurrence of emission of light. Reflectance and transmittance are detected by reading an intensity ratio as a signal. On the other hand, when the emission of light is detected as a signal, the occurrence or non-occurrence of emission of light of a specific wavelength can be read as a signal, and reading contrast (S/N) is improved as compared with that in a case where an intensity ratio is read.

The following nonlimitative examples are illustrative of the present invention.

EXAMPLE 1

FIGURE shows an example of the recording method for a three-dimensional optical memory glass element in accordance with the present invention. The light oscillated by an argon laser-excited Ti:sapphire laser and having a pulse width of 150 femto-seconds, a cycle period of 100 Hz and a wavelength of 800 nm was used as a recording pulsed laser beam 1. When this pulsed laser beam 1 was applied to a sample 4 (a fluoride glass having a composition of $35AlF_3$-$13YF_3$-$10MgF_2$-$20CaF_2$-$10SrF_2$-$10BaF_2$-$2SmF_3$ expressed by mol %) by condensing the same to a spot of around 600 nm by using planoconvex lenses 6, a beam splitter 2 and an objective lens 3 (NA=0.9, ×100) so that a focal point was positioned in the interior of the sample, coloring was ascertained in a fine region of around 600 nm in diameter in a position close to a focal point. When the light of a wavelength of 514 nm was convergently applied to this colored region to measure an emission spectrum of the irradiated region, it was discovered that the emission spectrum agreed with that of bivalent Sm ions. An emission spectrum obtained in the same manner from a region not irradiated with a pulsed laser beam agreed with that of trivalent Sm ions. In view of these results, it was ascertained that valence of Sm in a portion in the vicinity of the focal point was reduced from three to two.

The sample was then set on an electric stage 5 capable of being scanned with a pulsed laser beam in X, Y and Z directions. Then, the pulsed laser beam was convergently applied to the sample with the sample fixed in the direction of the Z-axis (optical direction), by turning on and off a pulsed laser repeatedly while scanning the sample in the XY direction with the laser beam of a peak energy density in a converging region of $10^{11}$ W/cm$^2$, whereby fine spots in which a valence of Sm was varied were formed or recorded on an XY plane. The electric stage was thereafter moved 3 μm in the direction of the Z-axis, and a writing operation was carried out in the same manner in the XY directions. As a result, fine spots in which a valence of Sm was varied three-dimensionally were recorded at 3 μm layer intervals. The sample was then scanned in the XYZ directions with a 514 nm light to follow the fine spots, while this light was convergently applied thereto, to observe the light emission through a filter which permits transmission of only light rays of 670–740 nm. It was ascertained that light emission was detected only in the spot region to which the pulsed laser beam was applied, and that information could be recorded in the X, Y and Z directions, i.e., three-dimensionally.

EXAMPLE 2

The three-dimensional writing of information in a glass matrix was conducted by scanning an electric stage with a pulsed laser beam in XYZ directions in the same manner as in Example 1 by using the same apparatus as shown in FIGURE except that a glass of $20Al_2O_3$-$65B_2O_3$-$10Na_2O$-$5Sm_2O_3$ expressed by mol % was used as a sample optical memory medium. Each moving distance of the electric stage in the direction of the Z-axis was 5 μm, and the light oscillated by an argon laser-excited Ti:sapphire laser and having a pulse width of 60 femto-seconds, a cycle period of 10 Hz and a wavelength of 800 nm was used as a pulsed laser beam. As a result, the reduction of Sm in spherical regions of 400 nm in diameter at 2 μm layer intervals were ascertained. It was also ascertained that an error of reading spots in upper and lower layers formed at 2 μm intervals did not occur, and that information could be recorded in X, Y and Z directions, i.e., three-dimensionally.

EXAMPLE 3

A writing operation was carried out in the same manner as in Example 2 by using LiYF$_4$:SmF$_3$ single crystals as a sample material for an optical memory medium. As a result, it was ascertained by detecting the emission in the same manner as mentioned above that information could be recorded and read in the X, Y and Z directions, i.e., three-dimensionally.

As described above, the three-dimensional optical memory medium according to the present invention is obtained by forming spots, in which valence of luminescent ions, such as rare earth element ions differ locally from that of surrounding luminescent ions, in a luminescent-ion-containing solid medium by applying a recording pulsed laser beam to an arbitrary position therein while three-dimensionally moving the solid medium relative to a focal point of the pulsed laser beam, and thereby providing a region in which emission wavelength and luminous intensity of the luminescent ions are different from those of a surrounding portion of the matrix. Since this region is three-dimensionally formed of focal points of the pulsed laser beam in the interior of the luminescent-ion-containing medium, it can be utilized for a high-density recording operation. Moreover, the emission is detected as a signal in comparison with the case of an optical memory medium in which reflectance is detected as a signal. This improves the reading contrast to a very high level, and minimizes the reading error.

The entire disclosure of Japanese Patent Application No. 2000-022315 filed on Jan. 31, 2000, including specification, drawings, claims and summary, is incorporated herein by reference in its entirety.

What is claimed is:

1. A three-dimensional optical memory medium comprising:
    a solid medium forming a base substrate of said optical memory, said solid medium being made of a fluoride glass comprising (a) aluminum fluoride and (b) luminescent ions that are trivalent Sm ions; and
    a plurality of spots which are three-dimensionally distributed in said solid medium, said spots containing luminescent ions that are bivalent Sm ions formed as a result of condensing a pulsed laser beam in said solid medium.

2. A three-dimensional optical memory medium according to claim 1, wherein said spots are different from said solid medium in emission wavelength and/or luminous intensity.

3. A three-dimensional optical memory medium according to claim 1, wherein said pulsed laser beam has a wavelength that is different from an absorption wavelength of said solid medium.

4. A three-dimensional optical memory medium according to claim 1, wherein said pulsed laser beam has a peak power density of $10^8$–$10^{17}$ W/cm$^2$.

5. A three-dimensional optical memory medium according to claim 1, wherein said pulsed laser beam has a pulse width not greater than $10^{-10}$ seconds.

6. A process for producing a three-dimensional optical memory medium, said medium comprising:
    a solid medium forming a base substrate of said optical memory, said solid medium being made of a fluoride glass comprising (a) aluminum fluoride and (b) luminescent ions that are trivalent Sm ions; and
    a plurality of spots which are three-dimensionally distributed in said solid medium, said spots containing luminescent ions that are bivalent Sm ions formed as a result of condensing a pulsed laser beam in said solid medium, said process comprising:
    (a) providing a solid medium comprising luminescent ions that are trivalent Sm ions;
    (b) condensing a pulsed laser beam to a focal point in said solid medium such that a spot corresponding to said focal point is formed in said solid medium, said spot comprising luminescent ions that are bivalent Sm ions; and
    (c) three-dimensionally scanning said solid medium with said pulsed laser beam such that a plural number of spots are formed three-dimensionally in said solid medium, thereby producing said three-dimensional optical memory medium.

7. A process according to claim 6, wherein said pulsed laser beam has a wavelength that is different from an absorption wavelength of said solid medium.

8. A process according to claim 6, wherein said pulsed laser beam has a peak power density of $10^8$–$10^{17}$ W/cm$^2$.

9. A process according to claim 6, wherein said pulsed laser beam has a pulse width not greater than $10^{-10}$ seconds.

10. A process for reading information from a three-dimensional optical memory medium, said medium comprising:
    a solid medium forming a base substrate of said optical memory, said solid medium being made of a fluoride glass comprising (a) aluminum fluoride and (1) luminescent ions that are trivalent Sm ions; and
    a plurality of spots which are three-dimensionally distributed in said solid medium, said spots containing luminescent ions that are bivalent Sm ions formed as a result of condensing a pulsed laser beam in said solid medium, said process comprising:
        irradiating said three-dimensional optical memory medium with a laser beam having a wavelength such that said luminescent ions contained in said spots are selectively excited and thereby emit light.

* * * * *